Oct. 4, 1927.
H. A. LEDYARD ET AL
1,644,532
SEPTIC TANK
Filed Nov. 11, 1925
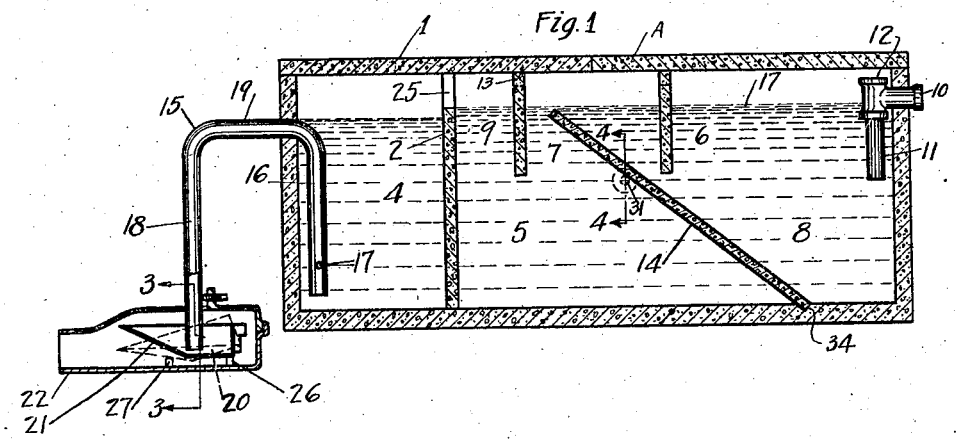
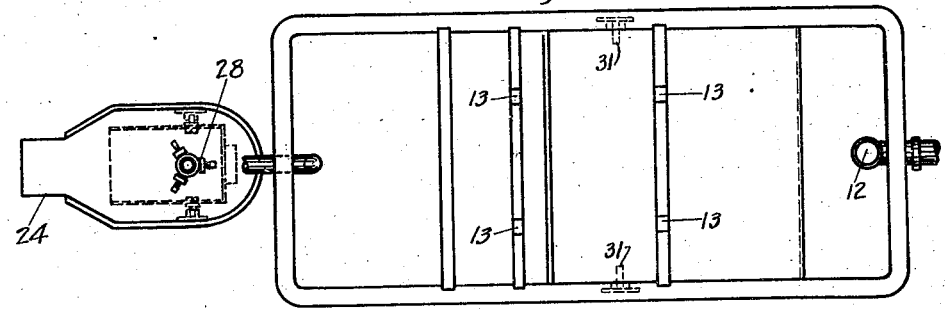
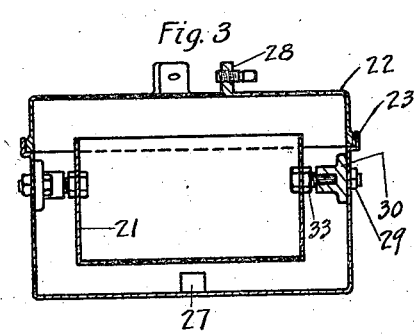
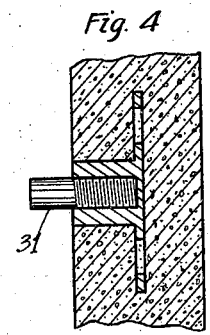
Inventor
Harry A. Ledyard
and
James J. Jellers
By
their Attorney Patented Oct. 4, 1927.

1,644,532

UNITED STATES PATENT OFFICE.

HARRY A. LEDYARD AND JAMES J. JELLEY, OF ASHLAND, OHIO; SAID JELLEY ASSIGNOR TO SAID LEDYARD.

SEPTIC TANK.

Application filed November 11, 1925. Serial No. 68,430.

This invention is directed to a septic tank, designed more particularly for household use, wherein the discharge of sewage thereto is not continuous.

The invention has for its principal object the combination with a septic tank of an automatic siphonic discharge, whereby, under the accumulation of a predetermined amount of purified liquid in the tank, a discharge thereof will automatically take place, in order that the tank may remain in continuous service without attention or clearing.

A further object of the invention is the provision of a tank of this character wherein the purification of the sewage is through the activity of anaerobic bacteria, and in which tank provision is made for maintaining an activated sludge for meeting the incoming sewage, a settling section receiving the flow and permitting the necessary quiescence for the bacterial change of the sewage. The purified water is then permitted to flow to a delivery chamber, in which it accumulates to a depth to induce automatic operation of the siphonic discharge.

The invention is illustrated in the accompanying drawing, in which:—

Figure 1 is a view in longitudinal section of the improved septic tank and automatic discharge therefor.

Figure 2 is a plan of the same.

Figure 3 is an enlarged transverse section on the line 3—3 of Figure 1.

Figure 4 is an enlarged section on the line 4—4 of Fig. 1.

The improved septic tank, in the form illustrated, is preferably made of concrete, of hollow construction, and in appropriate size. This tank 1 is designed to be buried in the ground below the frost line, and sealed against the admission of air except as such may enter with the sewage.

The tank is divided by a vertical partition 2, extending the height of the water level of the tank and arranged near the outlet end, into a delivery chamber 4, and a purifying chamber 5. The purifying chamber is provided with partitions 6 and 7, depending from the top thereof, and terminating above the mid-height of the tank. Partition 6, which is arranged about mid-length of the purifying chamber defines an initial treating or what might be termed an activated sludge tank 8, while partition 7, which is arranged adjacent the partition 2, defines with partition 6 a final treating tank, and with partition 2 a space 9 for maintaining the water in more or less quiescent state prior to its passage into the delivery tank. Partitions 6 and 7 also support the cover A.

The sewage is delivered to the initial or activated sludge tank 8, through an inlet 10, which delivers the material through a downpipe 11, opening below the level of the fluid in the tank, the inlet opening upwardly, as at 12, to permit the air entering with the sewage to accumulate above the fluid in the purifying chamber 5, the partitions 6 and 7 being formed with openings 13 to permit free movement of the air and gases. The heavier material separates from the incoming sewage and settles to the bottom of tank 8, and forms a scum for the propagation of the bacteria, while the heavier materials settle and is attacked by the bacteria. The accumulation gradually flows to the final treating tank, rising gradually and quietly over an inclined partition 14, the lower end of which seats in a recess in the floor of the tank 8, and from which this partition inclines upwardly, spaced from the lower end of partition 6 and terminating in the final treating tank slightly below the predetermined height of fluid for the tank. The summary action of the bacteria in the initial tank is continued in the final treating tank, the provision of the inclined partition permitting the gradual flow of the fluid from one tank to the other without agitation, and permitting such bacterial action to continue in the final treating tank in that quiescent state best adapted for such action.

The automatic discharge is in the form of a siphon 15, with a short leg 16 arranged in the delivery tank and having an air-inlet 17 above the lower open end, and a long leg 18 arranged beyond the tank proper. The connection 19 between the legs of the siphon is substantially at the height determined as the normal height of the fluid in the tank.

The long leg of the siphon discharges into an open pan 20, having an upwardly-inclined discharge lip or section 21, and pivotally supported in a casing 22 made in two sections and removably secured together, as at 23. The casing has an outlet section 24, which may be connected to any suitable form of conveyor to carry the fluid to a point of discharge. For example, such conveyor may be in the form of hollow tiles with spaced joints to permit the water to discharge at each joint for the enrichment of the soil, though any other discharge may be provided.

When the purified water in the final treating tank rises between the partition 7 and partition 2, and reaches the opening 25 in the latter, it will accumulate in the delivery tank or chamber 4 and fill the short leg of the siphon. When reaching the appropriate height the water will gradually flow through the connection 19, and down the long leg of the siphon into the pan 20, sealing the lower open end of the leg 18 and trapping the air therein, which causes the water to fill the chamber 4 until the head of the water in chamber 4 is the same height in inches or the like as the height of the water is increased in inches in pan 20. The head of water in chamber 4 may be above the bottom of the connection 19 in order to start the siphon action. Under accumulation of a sufficient weight of water in the pan the latter will tilt, discharging such water, and thereby drawing the air from the long leg of the siphon, and starting the siphonic action. It is of course understood that the water is accumulating in the delivery chamber above the siphon during the initial action, and this head of water contributes to the air discharge from the long leg of the siphon. The pan 20 is so hung as to be normally, that is in the absence of water therein in a horizontal position, against a stop 26, and under tilting is limited by a similar stop 27.

The siphonic action continues until a sufficient quantity of the water has been drawn from the tank to level of the bottoms of the pipe. The hole or vent 17 in the short leg of the siphon permits air to enter breaking the seal, when the discharge will then cease until a further accumulation of water in the delivery chamber. The predetermined height of water in the delivery tank at which discharge commences is preferably controlled by moving the pan farther or nearer to the end of the long leg of the siphon, as obviously if a longer period is required to seal the open end of the long leg of the siphon, the water will rise higher in the delivery tank before commencing the discharge. This adjustment is provided for by supporting the casing 22 from the long leg of the siphon through the medium of screws 28, thus permitting the distance of the pan from the open end of the siphon leg to be regulated as desired.

The improved septic tank thus permits the propagation of the bacteria, and the sludge at the bottom of the initial tank is always activated to meet the incoming sewage. The activity of the bacteria is permitted to take place under that state of quiescence best adapted for their operation, and the purified water is automatically discharged under predetermined accumulation. The tank is thus entirely automatic, and may be permitted to function for years without attention.

The pan 20 is mounted upon trunnions 29, which are in turn journaled in bearings 30. The inclined partition 14 is supported upon brackets 31 molded in the concrete septic tank on each side thereof as shown more particularly in Fig. 2.

The scum, sludge or the like breeds more bacteria which destroy and decompose the solid material and this action takes place continuously in the quiescent chambers which are spaced apart by baffle or partition boards. The baffle or partition boards are adapted to keep the scum or solid particles from flowing freely through the tank. The liquid portions thereof percolate through the throat of the siphon to the long leg displacing the air and tilting the pan.

Attention is called to the fact that the flow of sewage in the septic tank flows throughout the entire width therein without obstruction or interference in any way. In other words a part of the sewage does not flow through a certain specific opening, but flows evenly the full width of the septic tank.

Having thus described the invention, what is claimed as new, is:—

1. A septic tank wherein means are provided for the bacterial treatment of the sewage whereby the flow of the sewage is free to flow quiescent throughout the full width, brackets imbedded in the side walls of the tank, in combination with an inclined partition for directing the flow of sewage, which is supported by said brackets, a delivery chamber in said tank for the accumulation of purified water from the sewage, partitions arranged in the tank to baffle the flow of liquid to retard its natural flow and a siphon opening into such chamber which is automatically started under a predetermined head of water in such chamber and stopped from flowing at a predetermined time.

2. In a septic tank provided with a series of barriers spaced apart from the top and bottom of the tank, in combination with an inclined partition which is spaced apart from the top of the tank and one of the depending barriers to retard and direct the flow of the sewage and keep same in a quiescent state to permit the bacterial treatment thereof, said flow being unobstructed and without interference so that the flow will be quiet throughout the full width and area of the tank, brackets imbedded in the sides of the tank to support the inclined partition, a siphon, and means comprising a tiltable vessel whereby said fluid is automatically permitted to flow from the tank when the vessel is filled with a predetermined amount of liquid and prevented from flowing therefrom until predetermined time, as and for the purpose described.

In testimony whereof we affix our signature.

HARRY A. LEDYARD.
JAMES J. JELLEY.